R. NELSON.
CHILD'S VEHICLE.
APPLICATION FILED JULY 3, 1917.
1,309,331.
Patented July 8, 1919.
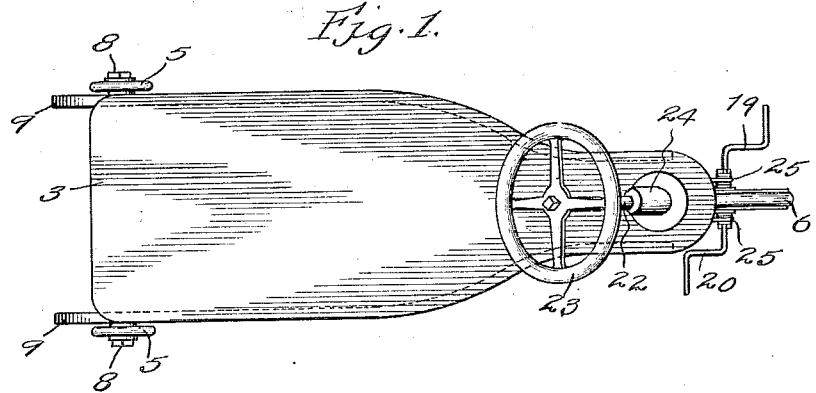
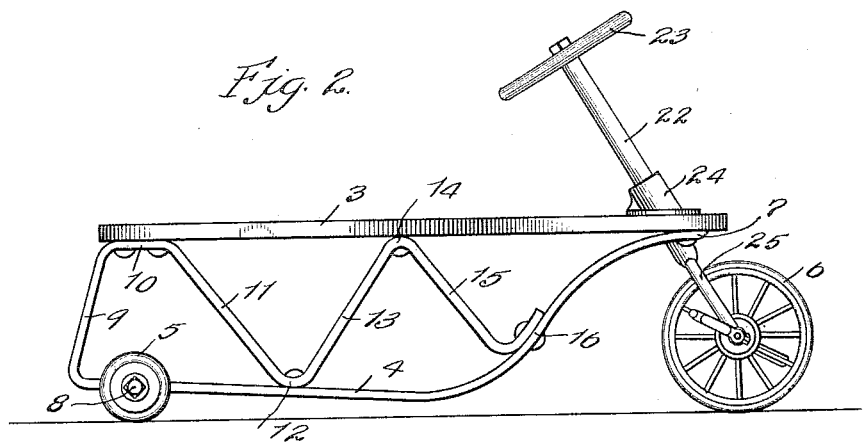
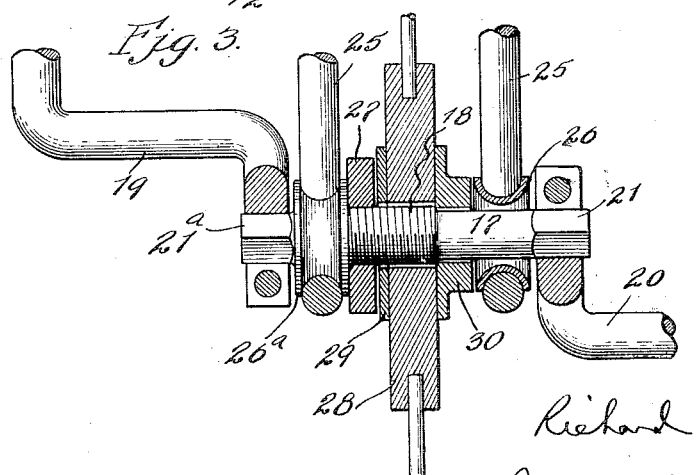

UNITED STATES PATENT OFFICE.

RICHARD NELSON, OF CHICAGO, ILLINOIS.

CHILD'S VEHICLE.

1,309,331.     Specification of Letters Patent.     Patented July 8, 1919.

Application filed July 3, 1917. Serial No. 178,400.

*To all whom it may concern:*

Be it known that I, RICHARD NELSON, a citizen of the United States, residing at Chicago, in the county of Cook and State of Illinois, have invented new and useful Improvements in Children's Vehicles, of which the following is a full, clear, concise, and exact description, reference being had to the accompanying drawing, forming a part of this specification.

My invention relates to improvements in children's vehicles and has for its object the production of a device that is made of few parts and the mechanism so arranged as to make it almost impossible to get out of order.

The further object is a production of a device that can be cheaply constructed.

This and such other objects as may hereinafter appear, are attained by my device, an embodiment of which is illustrated in the accompanying drawings, in which—

Figure 1 represents a top plan view of my device.

Fig. 2 represents a side elevation, and

Fig. 3 represents an enlarged sectional view of the supporting hub.

Like numbers of reference indicate like parts in the several figures of drawing.

Referring now to the drawing, my device consists in a seat 3, supported on a pair of frame members, 4, the individual members being bolted to each other and to the frame and supported at the rear on a pair of small wheels 5, and at the front on a single steering wheel 6. The individual frame members 4 are preferably formed from single strips of metal, one end of which is riveted or bolted to the seat as shown at 7, and extend down and rearwardly, supported by the axle 8 of the wheel 5, turned upwardly as shown at 9 and forwardly, forming a flat portion 10 riveted or bolted to the rear of the seat 3. The member is then continued downwardly as shown at 11, where it is bolted to the bottom of the frame at 12, then upwardly as shown at 13 and bolted to the seat again at 14, thence downwardly at 15 and bolted to the forward end of the member at 16. By this construction it will be noted that I effect a very simple girder form of structure in which the seat is well supported without the necessity of riveting parts together, the folding back and forth of the member on itself forming a very cheap and effectual construction. The steering wheel 6 is mounted on the axle 17, one end of which is threaded as at 18, treadles 19—20 are rigidly mounted on the squared ends of the shaft 17 at 21—21ª. The steering post 22 has a steering handle 23 rigidly mounted on the top and passes through a casting 24 secured to the front of the seat 3 and the steering forks 25 pass over the wheel and are mounted on sheaves or pulley wheels 26—26ª loose on the axle 17. A nut 27 is screwed on the threaded end of the axle inside the sheave 26ª. The hub 28 of the wheel 6 is loose on the shaft 17 and the washer 29 is interposed between the nut 27 and the hub. An enlarged washer 30 is interposed between the hub and the sheave 26, the washer being enlarged to make the construction symmetrical.

While I have shown a pair of wheels 5 mounted on the shaft 8, I may use a single wheel or pair of wheels similar to a roller skate to support the lower part of the vehicle and have them removably attached so that with the wheel removed, the frame will act as sled runners.

It will be noted that the member 4 inclines downwardly from the shaft so when the wheel 5 is removed, the bottom of the frame will lay flat with the surface of the ground and form a runner similar to a sleigh runner.

In the operation of my device with the washers and nut loose, the rapid revolution of the shaft by means of the pedals quickly binds the nut 27 and washer 29 together against the face of the hub 28, making the wheel itself rigid on the shaft, in which position the revolution of the treadles turns the wheel and propels the vehicle. When sufficient speed has been attained and it is desired to coast, the feet are set rigidly on the pedals and the revolution of the wheel loosens the nut, pressing the washer against the wheel hub, thus permitting the wheel to spin until such a time as the treadles are again operated by the feet.

If it is desired to adapt the device so that it may be pedaled backward, it is only necessary to form on the other end of the shaft 17 a reverse tread and substitute a nut and washer for the enlarged washer 30.

It will thus be noted that I have in a very simple way attained the same result as that accomplished by expensive machines and provided a device that can at all times be operated successfully and satisfactorily. By making the frame as I have of single members bent on themselves, I have made a very strong construction at a very small expense.

Having thus described my invention, what I claim as new and desire to secure by Letters Patent is:—

1. A device of the class described comprising a seat, a steering wheel axle, a steering wheel normally loosely mounted thereon, pedals rigid with said axle and frictional means mounted on said axle whereby said steering wheel may be locked rigid on said axle when said pedals are operated and permitted to revolve loose when said pedals are held rigidly against revolution.

2. A device of the class described comprising a seat, a steering wheel axle, a steering wheel normally loosely mounted thereon, pedals rigid with said axle and means whereby said steering wheel may be locked rigid on said axle when said pedals are operated and permitted to revolve loose when said pedals are held rigidly against revolution, said means including a bearing nut screwed on said axle on one side of said wheel.

3. A device of the class described comprising a seat, a steering wheel axle, a steering wheel normally loosely mounted thereon, pedals rigid with said axle and means whereby said steering wheel may be locked rigid on said axle when said pedals are operated and permitted to revolve loose when said pedals are held rigidly against revolution, said means including washers loosely mounted on said axle on either side of said wheel and a bearing nut screwed on said axle on one side of said wheel.

4. A device of the class described comprising a seat, a steering wheel axle, a steering wheel normally loosely mounted thereon, pedals rigid with said axle and means whereby said steering wheel may be locked rigid on said axle when said pedals are operated and permitted to revolve loose when said pedals are held rigidly against revolution, said means including washers loosely mounted on said axle on either side of said wheel and a bearing nut screwed on said axle on one side of said wheel, and adapted to frictionally engage one of said washers and press it against the face of the wheel.

In witness whereof I have hereunto subscribed my name.

RICHARD NELSON.

Copies of this patent may be obtained for five cents each, by addressing the "Commissioner of Patents, Washington, D. C."